Dec. 5, 1961 A. W. FAECHER 3,011,508
RELAY FLUID VALVE

Filed July 17, 1959 2 Sheets-Sheet 1

INVENTOR.
ARTHUR W. FAECHER
BY *Philip G. Hilbert*
ATTORNEY

Dec. 5, 1961        A. W. FAECHER        3,011,508
RELAY FLUID VALVE
Filed July 17, 1959        2 Sheets-Sheet 2
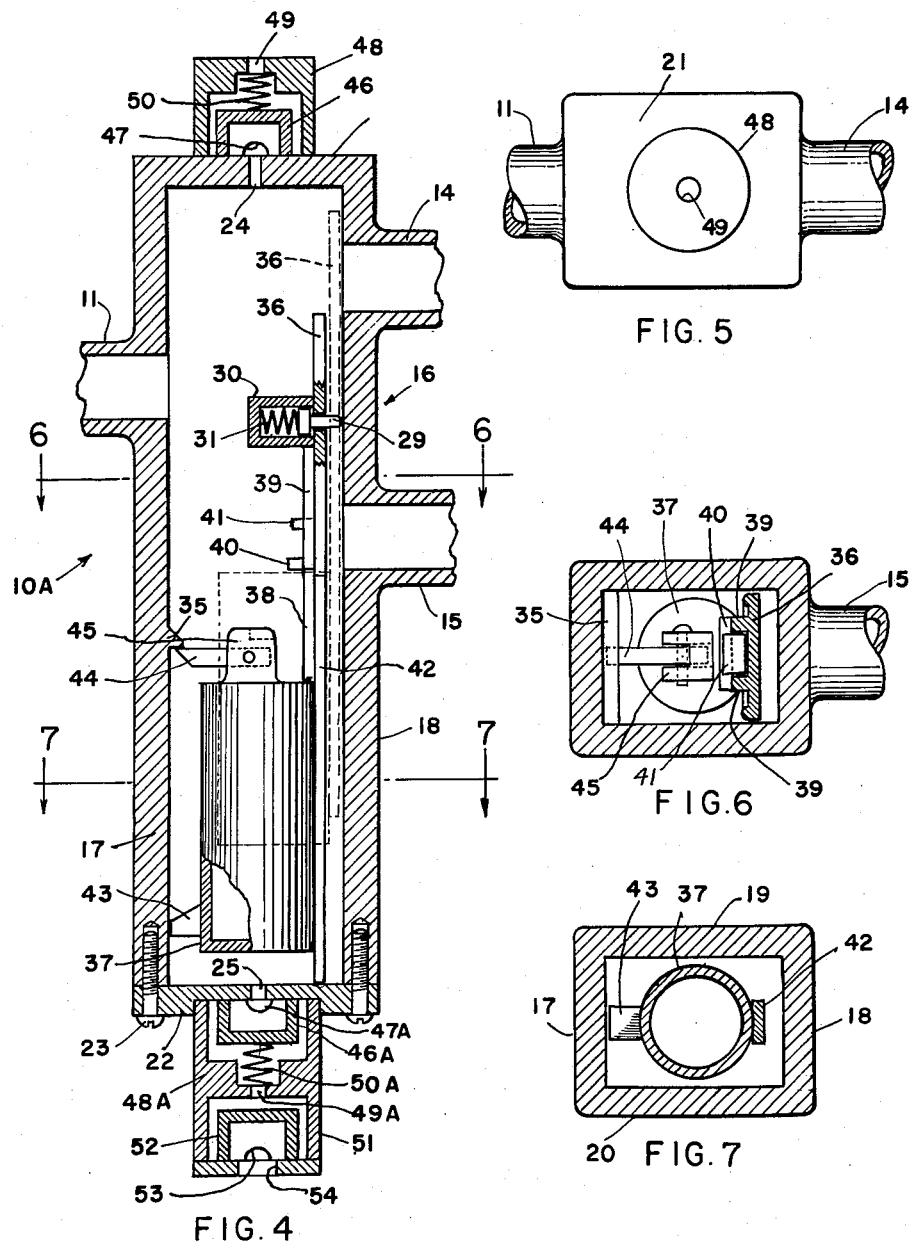
INVENTOR.
ARTHUR W. FAECHER
BY
ATTORNEY United States Patent Office 3,011,508
Patented Dec. 5, 1961

3,011,508
RELAY FLUID VALVE
Arthur W. Faecher, 46 Henry Drive, Glen Cove, N.Y.
Filed July 17, 1959, Ser. No. 827,832
9 Claims. (Cl. 137—120)

This invention relates to a relay fluid valve, and more particularly, concerns valves designed to pass fluid under pressure to alternative outlets of the valve.

It is frequently desirable to pass liquid under pressure to one or the other of a pair of outlets which may be connected to lawn sprinklers, tanks or the like. Thus, with relatively low water pressures which allow the operation of a single sprinkler at any given time, the flow of water may be relayed between a pair of sprinklers at successive time intervals. Also, after filling one tank with a given liquid, the second tank may be filled by use of a relay valve.

Accordingly, an object of this invention is to provide an improved relay valve which is operative to distribute liquid flowing under pressure to alternative outlets in response to a diminution in liquid pressure.

Another object of this invention is to provide an improved relay valve of simple construction, including a minimum number of parts and which operates automatically in response to a momentary reduction in line pressure on the inlet side of the valve.

Yet another object of this invention is to provide an improved relay valve particularly adapted for use with lawn sprinklers, wherein the valve may be located above or below ground level, yet require little or no maintenance in either case.

Other objects of this invention will in part be obvious and in part hereinafter pointed out.

In the drawing, FIG. 1 is a vertical sectional view of a valve embodying the invention;

FIG. 4 is a vertical sectional view of a modified form of said valve;

FIG. 5 is a top plan view thereof;

FIG. 6 is a transverse sectional view taken on line 6—6 of FIG. 4; and

FIG. 7 is a transverse sectional view taken on the line 7—7 of FIG. 4.

Figure 2:
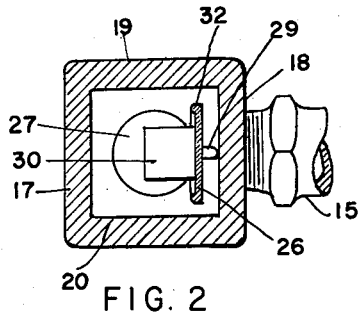
FIG. 2 is a transverse sectional view taken on the line 2—2 of FIG. 1.
Figure 1:
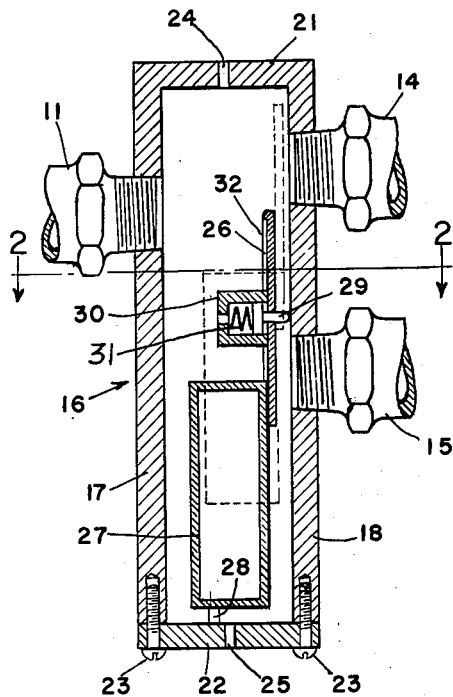
Figure 3:
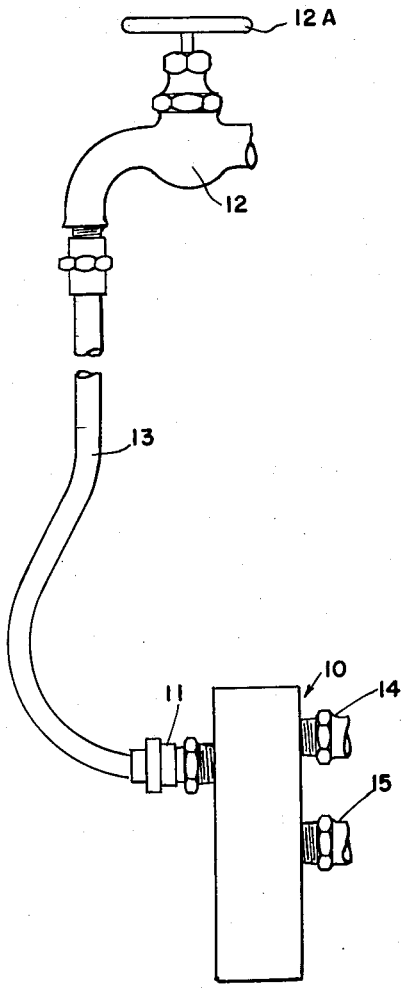
FIG. 3 is a view showing the valve attached to a source of liquid.

Referring in detail to FIGS. 1–3, 10 designates one form of relay valve embodying the invention. Valve 10 is provided with an inlet 11 which is connected to a suitable source of liquid to be controlled, such as a water outlet as at 12, by conduit 13. Valve 10 further includes a pair of outlets 14, 15 which are selectively opened by the operation of said valve.

Valve 10 comprises a rectangular shaped casing 16 having a pair of opposed end walls 17, 18; a pair of opposed side walls 19, 20; a top wall 21 integral with said end and side walls and a bottom wall 22 detachably mounted in place by screws 23. Inlet 11 is mounted on an upper portion of end wall 17, while outlets 14, 15, in vertically spaced arrangement, are mounted on end wall 18. Top wall 21 is provided with a vent 24 and bottom wall 22 is provided with a vent 25, for the purpose hereinafter described. The casing 11 may be formed of plastic by molding, or of other suitable materials.

The valve 10 arranged in an upright position and above ground, is adapted to relay liquid such as water from source 12 to either of the outlets 14, 15 as desired, by momentarily reducing the pressure of said water on the inlet side of valve 10, as by turning valve handle 12A to shut off the flow of water and then turning said handle back to open position.

To this end, valve 10 includes a valve plate 26 disposed interiorly thereof and arranged for vertical movement to selectively locate the same in opposed relation to outlets 14 or 15. A tubular float member 27 is secured in depending relation to the lower end of plate 26. Plate 26 and float member 27 may also be formed of plastic. A projection 28 integral with the bottom wall of float member 27 maintains said float member in spaced relation to casing wall 22, when said float member is in its lowermost position.

Valve plate 26 carries on an intermediate portion thereof a spring pressed pin 29 which projects through an opening in said plate toward casing wall 18. A small spring housing 30 on plate 26 encloses spring 31 for biasing pin 29 to its forward position to space said plate from casing wall 18.

The dimensions of valve plate 26 and float member 27 are such as to locate said plate in opposed relation to outlet 15 when the float member is in its lowermost position, leaving outlet 14 open and in communication with inlet 11. With float member 27 in an elevated position, valve plate 26 is located opposite outlet 14, leaving outlet 15 open and in communication with inlet 11.

With valve plate 26 in its normal, lower position, indicated by solid lines in FIG. 2; when valve handle 12A is rapidly turned to its on position, the water flowing under full pressure into valve 10 by way of inlet 11, presses valve plate 26 forwardly into contact with casing wall 18 before float member 27 is effective to raise plate 26 to an elevated position, thereby shutting off outlet 15 and leaving outlet 14 in communicating relation with inlet 11. Valve plate 26 may be provided with edge beading 32 to facilitate the pressure application of the water passing into casing 16. The action of spring 31 is overcome by said water pressure to allow the valve plate 26 to lie smoothly against casing wall 18.

Should it be desired to connect inlet 11 with the lower outlet 15, valve handle 12A is turned to its off position, allowing water within casing 16 to drain off through outlet 14 and vent 25, aided by vent 24. The valve handle 12A is then slowly turned toward its on position, the water flowing into casing 16 being effective to float valve plate 26 to its uppermost position indicated in dotted lines in FIG. 1. With the incoming water at full pressure, plate 26 will be pressed forwardly against casing wall 18, overcoming action of spring 31 and closing off outlet 14 and leaving outlet 15 in communicating relation with inlet 11.

To switch back to outlet 15, the pressure in conduit 13 and casing 11 is reduced by turning valve handle 12A to its off position, allowing the water in the casing to drain off by way of outlet 15, the plate 26 having been displaced from casing wall 18 by the action of spring 31, and valve plate 26 drops down to its lowermost position opposite outlet 15. When the water pressure is turned on again, valve plate 26 is pressed forwardly to close outlet 15. Thus, outlets 14 and 15 may be selectively connected to inlet 11 by appropriate manipulation of valve handle 12A. With outlets 14, 15 connected to lawn sprinklers, not shown; either sprinkler may be placed in operation in a simple manner, particularly with low pressure conditions which would not permit simultaneous operation of both sprinklers.

In FIGS. 4–7 is shown a modified form of the invention, wherein a valve 10A, similar to valve 10, except as hereinafter set forth, may be buried in the ground in an upright position, as when it is undesirable to leave the valve exposed above ground.

Thus, casing 16 has an inlet 11 on wall 17 and outlets 14, 15 on wall 18 as in valve 10. On the inner surface of wall 17, intermediate the ends thereof is a transversely extending keeper 35, for the purpose later described. A valve plate 36 is vertically disposed within casing 16 for selectively closing outlets 14, 15. Valve plate 36 is connected at its lower end to the upper end of a cylindrical float 37 by a loose, slidable connection which includes a short, flat extension member 38 extending upwardly from said float 37 and in slidable contact with a lower portion of valve plate 36. Parallel guide strips 39 on plate 36, together with a cross strip 40 on the lower ends of strips 39 and an outward projection 41 on the upper end of member 38, guide and limit the vertical movement of float 37 relative to plate 36.

Valve plate 36 also includes a narrow, integral extension strip 42 depending from its lower end, which locates plate 36 in its lower position for closing off outlet 15 to leave outlet 14 in communication with inlet 11. Strip 42 also aids in guiding the movement of float 37 relative to plate 36. A lateral projection 43 on the lower end of float 37 keeps said float in spaced relation to casing wall 17 during the vertical movements of the float.

A laterally extending latch 44 is pivotally mounted between ears 45 on the top of float 37, for engagement with keeper 35 when valve plate 36 is displaced from casing wall 18 by spring pressed pin 29, for reasons later described. The vent 24 on top casing wall 21 is protected by an open bottom valve cap 46 having side vents 47. Cap 46 is enclosed by a cover member 48 open at the bottom thereof and fixed to casing wall 21. Cover member 48 is vented as at 49 and a spring 50 between valve cap 46 and cover member 48 biases valve cap 46 against casing wall 21.

Vent 25 on bottom casing wall 22 is similarly protected by valve cap 46A with side vents 47A and spring 50A, which are enclosed by a cover member 48A. In addition, an extended portion 51 of cover member 48A encloses a loosely mounted, open bottom cap 52 having side vents 53. Vent 49A establishes communication between the upper and lower portions of cover member 48A and the same is vented at its lower end at 54.

In normal usage, the operation of valve 10A is quite similar to that of valve 10 previously described, the manipulation of valve handle 12A being effective to move valve plate 36 to positions for selectively closing outlets 14, 15, through the action of float 37. With valve plate 36 in its normal, lower position, the pressure of water admitted to casing 16 at inlet 11 will immediately press plate 36 against casing wall 18, against the action of spring pressed pin 29, to close off outlet 15 and leave outlet 14 open. Such water pressure will overcome the bias of springs 50, 50A and valve caps 46, 46A will be moved to closing position against cover members 48, 48A respectively, to close off vents 49, 49A.

The reduction of pressure within casing 16, by appropriate manipulation of valve handle 12A, as previously described, will allow float 37 to rise and bring valve plate 36 to its upper position for closing outlet 14 and leaving outlet 15 open. The float 37 will have a small movement relative to plate 36 through the sliding connection therebetween, such movement being limited by the abutment of projection 41 against spring housing 30.

When the valve 10A is not in use, leakage in liquid source 12 may tend to fill casing 16 with water by way of conduit 13 and inlet 11. Such collection of water within casing 16 would raise float 37 and valve plate 36 to the upper position thereof. Since it is preferable to keep plate 36 in the lower position when the valve is not in use, to insure proper cycling for relay operation, latch 44 is effective for such purpose.

Thus, if valve plate 36 is in its lower position when valve handle 12A is turned off completely, spring pressed pin 29 will displace the float 37 toward casing wall 17 and bring latch 44 below keeper 35. When water collects in the casing 16, latch 44 and keeper 35 will keep float 37 and valve plate 36 against rising within casing 16.

Valve plate 36 is located in its proper lower position by the lower end of depending strip 42 seated on bottom casing wall 22. When water is initially admitted to casing 16 by way of inlet 11 to press valve plate 36 against casing wall 18, float 37 will have some upward movement relative to the plate, such movement being limited by abutment of projection 41 against spring housing 30, thus passing latch 44 above keeper 35. However latch 44 is free to pass keeper 35 on any downward movement of valve plate 36, since the latch can pivot in a clockwise direction on ears 45.

Water collecting in valve 10A between uses thereof, may be drained off by way of lower vent 25, through side vents 47A in cap 46A, vents 49A, 53 and 54; aided by air vent 24 and vents 47, 49 communicating therewith. Caps 46, 46A move to close vents 49, 49A only when the water pressure is sufficient to overcome the bias of springs 50, 50A. When water merely collects in the valve 10A, caps 46, 46A remain in their normal position as shown in FIG. 4, and such collected water will drain by way of vents 25, 47A, 49A, 53 and 54, as noted above. Since valve 10A is buried in the ground, a suitable tube, not shown, may be used to establish communication between vent 49 and the atmosphere. Loose cap 52 provides means for preventing dirt from plugging vents 25, 49A, particularly with any slight suction effects incident momentarily when valve handle 12A is turned off. In such case, cap 52 is lifted to close off vent 49A.

As various changes might be made in the embodiments of the invention shown herein without departing from the spirit thereof, all matter herein described or shown is deemed illustrative and not limiting except as set forth in the appended claims.

Having thus disclosed my invention, I claim as new and desire to protect by Letters Patent:

1. A relay valve comprising a casing having an inlet on one vertical wall portion thereof and a pair of vertically spaced outlets on another vertical wall portion opposite said one wall portion, plate means arranged for vertical movement within said casing for frictionally contacting the second mentioned wall portion and selectively closing said outlets, and float means on said outlet closing means.

2. A relay valve comprising a casing having an inlet on a first vertical wall thereof and a pair of vertically spaced outlets on a second vertical wall thereof opposed to said first vertical wall, a valve plate arranged for vertical and horizontal movement within said casing between a depressed position thereof wherein said valve plate frictionally engages said second vertical wall for closing one outlet and an elevated position thereof wherein said valve plate frictionally engages said second vertical wall for closing the other outlet, and float means fixed to said valve plate and responsive to liquid levels within said casing for moving said valve plate between said positions thereof.

3. A relay valve for selectively distributing an incoming stream of liquid to one of two outlets comprising a casing adapted to be disposed in a vertical position, said casing having opposed flat vertical wall portions, inlet means for said incoming stream on one of said wall portions, a pair of vertically spaced outlet means on the other of said wall portions, a valve plate movably mounted within said casing in opposed relation to said other wall portion and operative in alternative vertical positions thereof to frictionally contact said other wall portion and close one outlet means while leaving the other outlet means open, flat means secured to the lower end of said valve plate and responsive to liquid levels within said casing for moving said valve plate between said positions.

4. A relay valve comprising a casing having inlet means and a pair of vertically spaced outlet means, means arranged for vertical movement within said casing and operative in one position thereof to close one outlet means and to leave the other outlet means open, and in another position thereof to leave said one outlet means open and to close the other outlet means, float means responsive to liquid levels within said casing for moving said outlet closing means between said positions thereof, said outlet closing means being retained in the respective positions thereof by the pressure of liquid from said inlet means and being movable between said positions in response to a reduction in said liquid pressure, and means responsive to the reduction in liquid pressure to displace said outlet closing means horizontally and away from said outlet means.

5. A valve as in claim 4 wherein said last mentioned means comprises a spring pressed element between said outlet closing means and an opposed casing wall portion including said outlet means, said spring pressed element being operative to displace said outlet closing means away from said outlet means.

6. A valve as in claim 5 and further including latch means cooperative with said spring pressed element for retaining said outlet closing means in a depressed position despite leakage of liquid into said casing which would tend to raise said outlet closing means to an elevated position.

7. A valve as in claim 6 wherein said latch means comprises a keeper on said casing and a latch member pivotally mounted on said float for engagement with said keeper member upon upward movement of said outlet closing means while said outlet closing means is displaced from said outlet means, said latch member being movable to a position clearing said keeper as said outlet closing means moves downwardly from an elevated position to a depressed position.

8. A valve as in claim 7 wherein said float is slidably related to said outlet closing means.

9. A valve for selectively directing liquid delivered under pressure to an inlet to a pair of outlets comprising a casing having opposed walls, said casing being disposed in a position wherein said walls are vertically located, a pair of vertically spaced outlets at the upper end of one of said walls, an inlet at the upper end of the other of said walls, a valve plate arranged for vertical movement within said casing and operative to selectively close said outlets in response to admission of liquid under pressure into said casing, means within said casing for locating said valve plate in a depressed position wherein the lower outlet is closed and the upper outlet is open, said locating means including a float whereby a reduction in the liquid pressure within said casing will cause said valve plate to rise to an elevated position wherein the upper outlet is closed and the lower outlet is open, the normal pressure of said liquid retaining said valve plate in said elevated position, and spring means arranged to bias said valve plate away from said one wall when the liquid pressure within said casing is reduced.

References Cited in the file of this patent
UNITED STATES PATENTS
2,807,275     Steidley _____ Sept. 24, 1957